United States Patent [19]
Lynch et al.

[11] Patent Number: 5,455,751
[45] Date of Patent: Oct. 3, 1995

[54] LANTERN

[75] Inventors: Peter F. Lynch; David A. Furth, both of Skeneatles; Mark A. Ferguson, Jamesville, all of N.Y.

[73] Assignee: Eveready Battery Company, Inc., St. Louis, Mo.

[21] Appl. No.: 306,876

[22] Filed: Sep. 15, 1994

[51] Int. Cl.⁶ .................................................. F21L 7/00
[52] U.S. Cl. .................. 362/194; 362/183; 362/199; 362/258; 362/387; D26/44
[58] Field of Search ................................. 362/157, 183, 362/190, 194, 195, 199, 387, 389, 399, 258; D26/44, 45, 50

[56] References Cited

U.S. PATENT DOCUMENTS

| | | | |
|---|---|---|---|
| D. 162,578 | 3/1951 | Potekin | D26/42 |
| D. 190,520 | 6/1961 | Graubner | D26/44 |
| D. 213,126 | 1/1969 | Doman | D48/24 |
| D. 243,272 | 2/1977 | Okuno et al. | D48/24 R |
| D. 255,276 | 6/1980 | Mann | D26/44 |
| D. 265,427 | 7/1982 | Mann | D26/44 |
| D. 276,375 | 11/1984 | Fenne | D26/44 |
| D. 279,221 | 6/1985 | Schosser et al. | D26/44 |
| D. 284,106 | 6/1986 | Drane | D26/44 |
| D. 287,292 | 12/1986 | Yuen | D26/38 |
| D. 295,561 | 5/1988 | Hsiao | D26/48 |
| D. 308,256 | 5/1990 | Ohashi | D26/48 |
| D. 311,592 | 10/1990 | Jones | D26/44 |
| D. 313,665 | 1/1991 | Yuen | D26/44 |
| D. 328,501 | 8/1992 | Yuen | D26/42 |
| D. 329,504 | 9/1992 | Yuen | D26/42 |
| D. 337,840 | 7/1993 | Ekeroth | D2/44 |
| D. 338,542 | 8/1993 | Yuen | D26/42 |
| D. 338,975 | 8/1993 | Yuen | D26/48 |
| D. 344,602 | 2/1994 | Yuen | D26/42 |
| D. 348,318 | 6/1994 | Schultz | D26/37 |
| 2,861,174 | 11/1958 | Talbot et al. | 362/228 |
| 3,944,805 | 3/1976 | Moore | 362/194 |
| 4,369,487 | 1/1983 | Carlow | 362/387 |
| 4,447,863 | 5/1984 | Fenne | 362/199 |
| 4,654,764 | 3/1987 | Hsiao | 362/199 |
| 4,740,872 | 4/1988 | Chou | 362/183 |
| 5,003,450 | 3/1991 | Burton et al. | 362/387 |

OTHER PUBLICATIONS

Eveready Lighting Products Brochure dated Spring 1983.

Primary Examiner—Stephen F. Husar
Attorney, Agent, or Firm—Robert W. Welsh; Richard C. Cooper

[57] ABSTRACT

A lantern assembly is provided having a handle supporting beam. The handle is attached to a low profile base containing a channel defined about its circumference configured to receive and stow a length of electric cord therein. The electric cord is connected at one end to a pair of terminals extending from the top of the base, which also serves to attach the handle to the base. The opposite end of the electric cord is attached to a connector for coupling the lamp to the vehicle power supply. The lamp configuration is specially configured and adapted to easily convert a battery-powered lantern to one for use with a vehicle.

14 Claims, 7 Drawing Sheets

1
LANTERN

BACKGROUND OF THE DISCLOSURE

This invention relates generally to portable lighting products and more specifically to a lantern or similar hand-held light.

Conventional battery-powered, portable lanterns such as an Eveready® brand 321 lantern, generally include a handle supporting a swiveling lamp at one end and a colored signal lamp at an opposite end. Both lamps are typically powered by a battery containing eight No. 60 (size "F") cells in series. In some instances, a battery is enclosed within a case which also provides the base for the lantern. See, for example, U.S. Pat. No. 2,861,174. In other designs, such as the 321 lantern, the lantern handle is attached directly to the battery through the battery terminals extending from the top of the battery. The casing of the battery itself provides the base for the lantern.

Although the battery provides a powerful and portable power source for the lantern, the batteries become discharged over time and cannot power the lamp when needed. Another disadvantage is that the batteries are quite heavy, making it uncomfortable to hold over a period of time. A further disadvantage of such systems is that the battery casing can break open and leak, resulting in burns and stains to persons and property.

Trouble lights have been designed for use specifically with vehicles. The light sources are conventionally plugged into the cigarette lighter receptacle to be powered by the vehicle battery or power system. Such lamps often have a lamp fastened to a pistol grip or straight handle. The electric cord interconnecting the light to the cigarette lighter receptacle simply hangs loose and is stored by winding the cord into a coil. Although not dependant upon a separate power source (which may leak) and lighter in weight than conventional battery-powered lanterns, such lamps are difficult to rest on a surface with the beam directed at a particular spot. Furthermore, because the cords hang free, they often become entangled with themselves and with other equipment in the storage area of the vehicle.

SUMMARY OF THE INVENTION

In one form, the invention provides a lantern assembly including a handle supporting a beam. The handle is attached to a low-profile base containing a channel defined about its circumference configured to receive and stow a length of electric cord therein. The electric cord is connected at one end to a part of terminals extending from the top of the base, which also serves to attach the handle to the base. The opposite end of the electric cord is attached to a connector for coupling the lamp to the vehicle power supply.

In another form of the invention, the base also includes a top member interconnected to a bottom member by a lesser diameter neck portion which also serves to define the circumferential channel. To detachably retain the cord and the connector attached to the end of the cord within the base, a lip is provided extending from one side wall of the channel to impinge upon the connector and retain it by friction.

According to another form of the invention, the footprint of the base has a length and width dimension greater than the height of the base, thus producing a lower center of gravity for the lamp and a more stable base. The lower surface of the bottom member preferably includes a tread or cleated surface to prevent slipping or sliding of the lantern on certain surfaces.

The advantages provided by this invention include a substantially reliable power supply without worrying about leaking caustic solutions, a light-weight lantern having a stable footprint for directing light to a desired spot, and a more compact package with easy cord storage than previously available using either battery or hand-held vehicle powered lanterns.

BRIEF DESCRIPTION OF THE DRAWING FIGURES

A better understanding of the invention and the advantages provided thereby may be obtained by reference to the specification and the attached drawing figures, wherein.

DETAILED DESCRIPTION OF THE VARIOUS EMBODIMENTS

Figure 2:
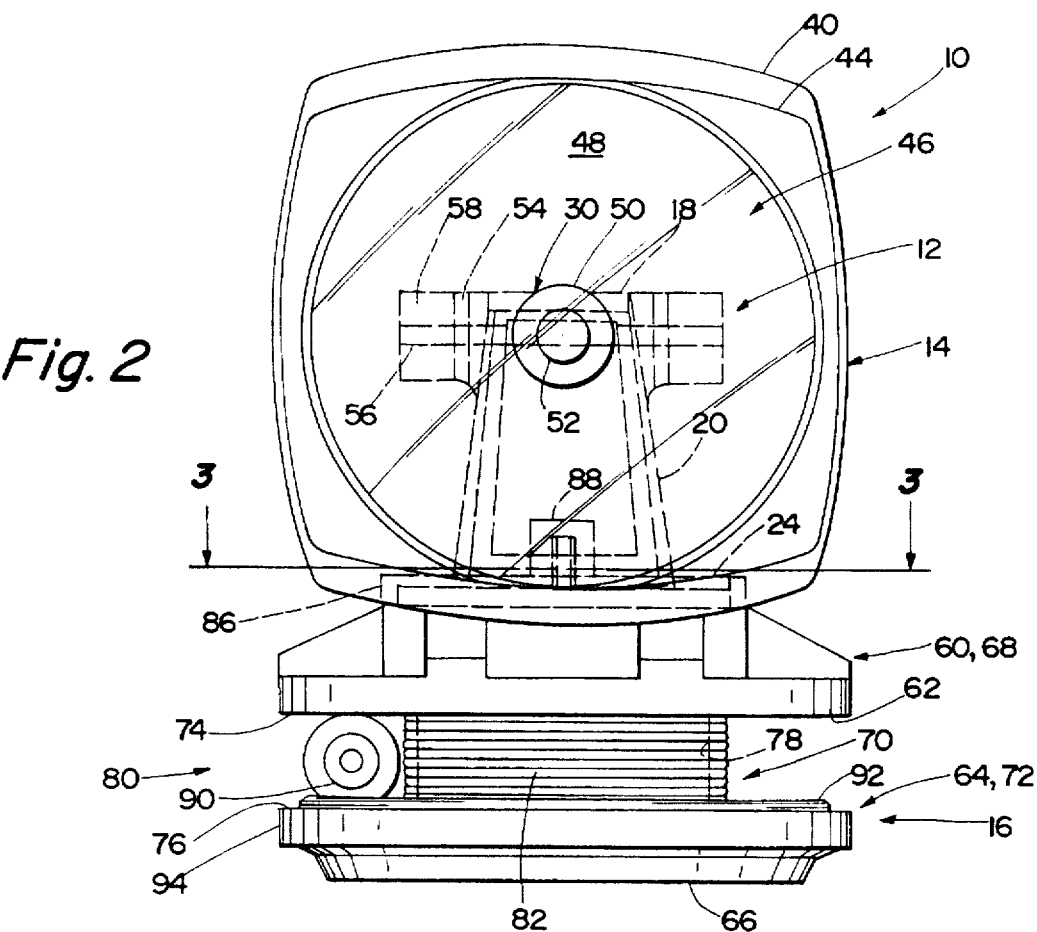
FIG. 2 is a front elevational view of the invention taken along lines II—II shown in FIG. 1.
Figure 3:
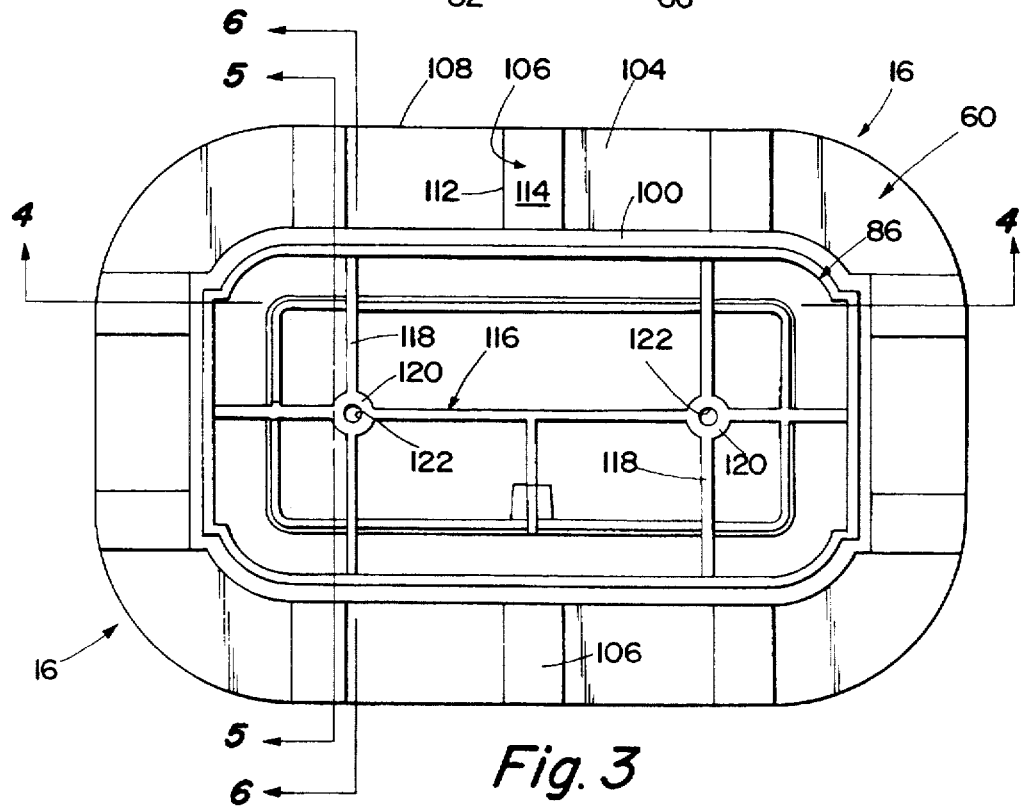
FIG. 3 is a plan view of the base assembly taken along lines III—III shown in FIG. 2.
Figure 4:
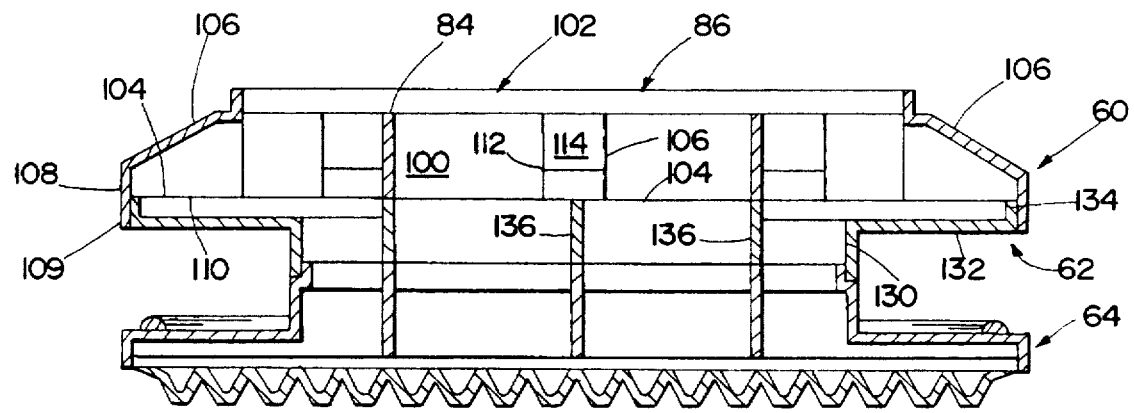
FIGS. 4–6 are sectional views of the base assembly taken along lines IV—IV, V—V, and VI—VI, respectively, shown in FIG. 3.
Figure 5:
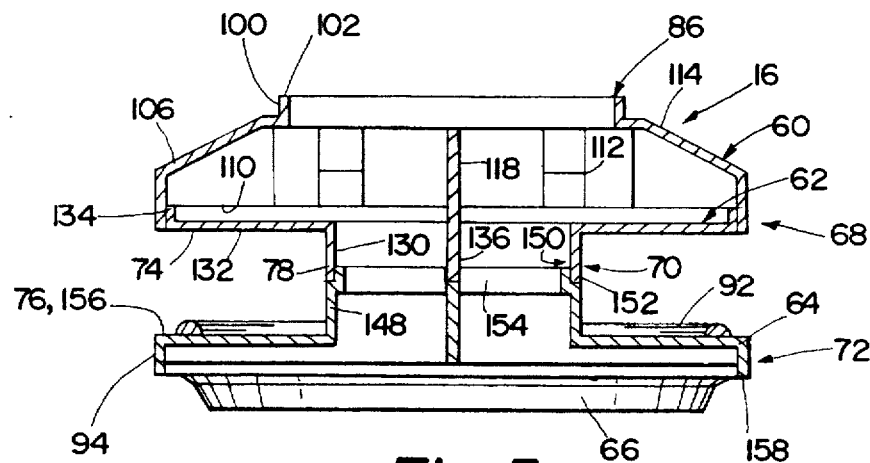
Figure 6:
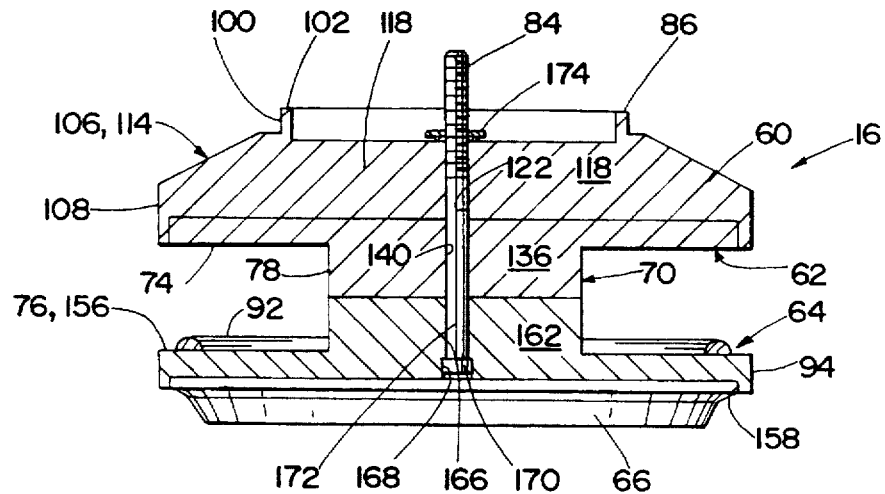
Figure 7:
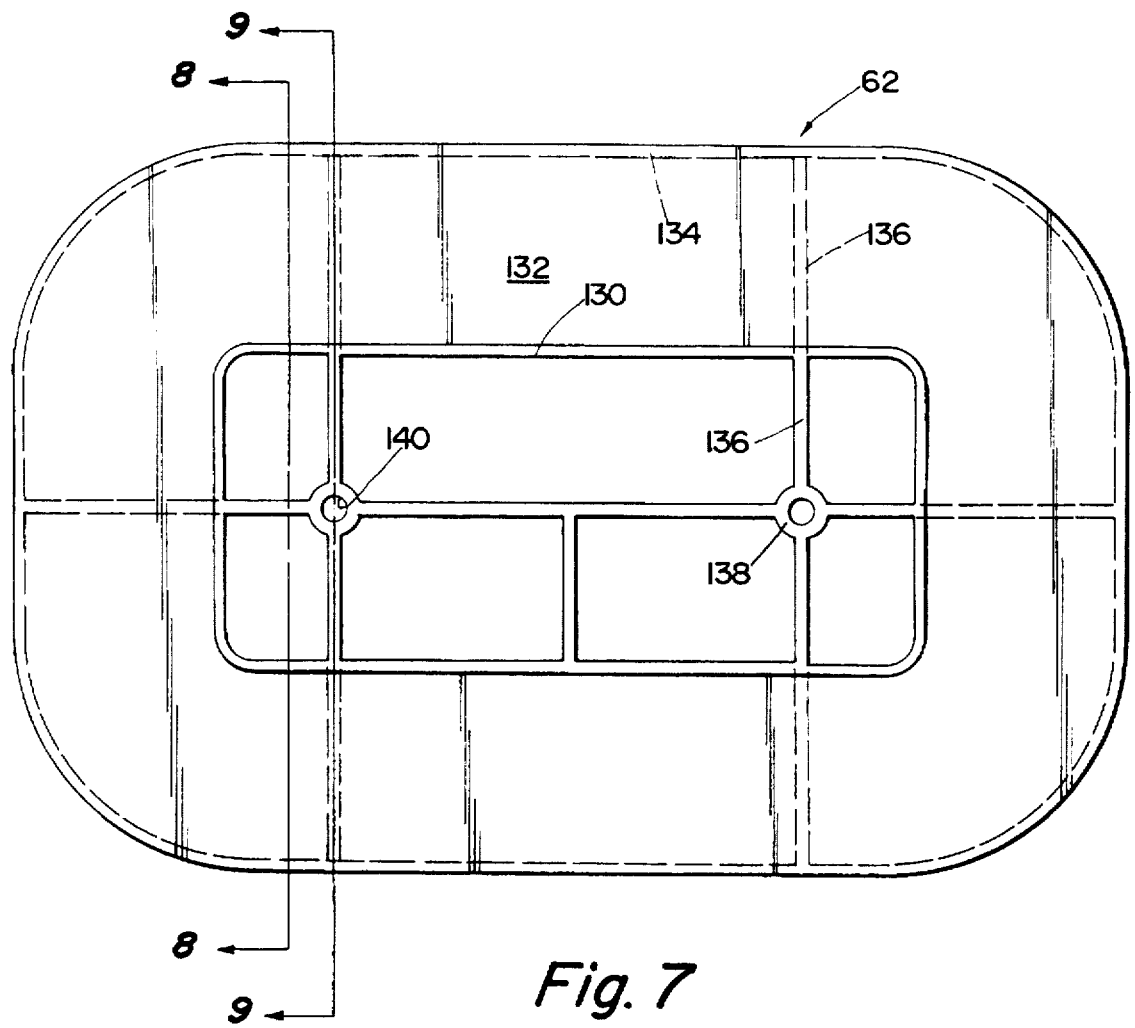
FIG. 7 is a bottom plan view of a top interior member comprising a portion of the base assembly.
Figure 8:
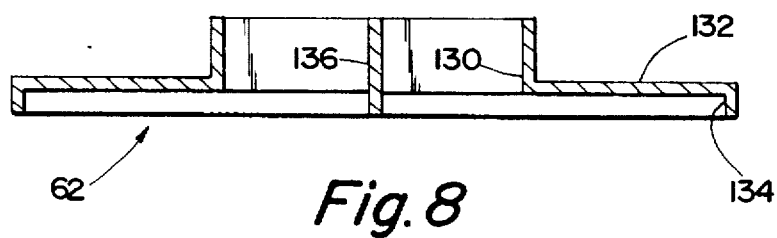
FIGS. 8 and 9 are sectional views of the top interior member taken along section lines VIII—VIII and IX—IX, respectively, shown in FIG. 7.
Figure 9:
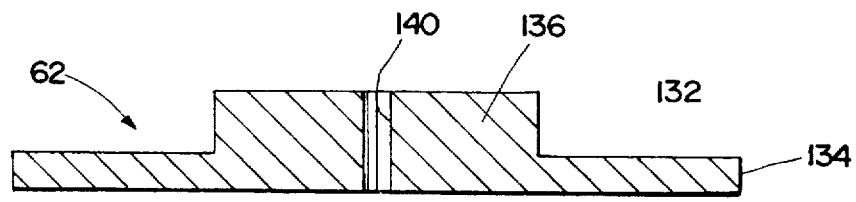
Figure 12:
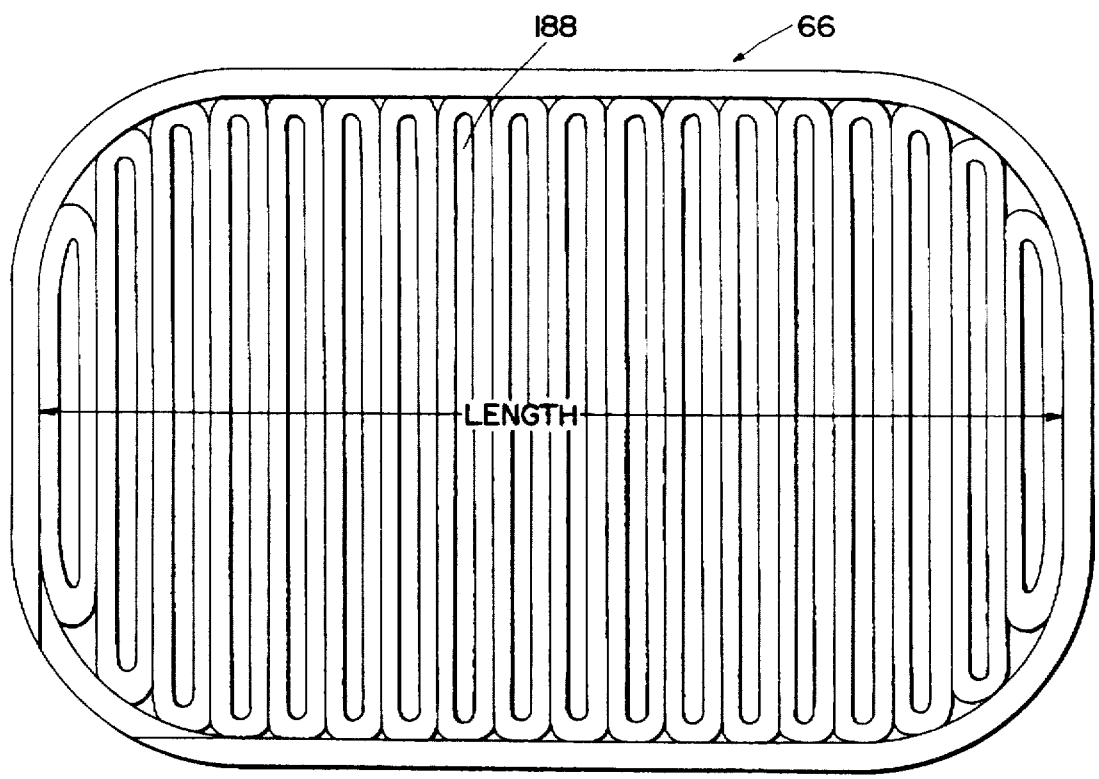
FIGS. 12 and 13 are top and bottom plan views of the foot member comprising a portion of the base assembly.
Figure 13:
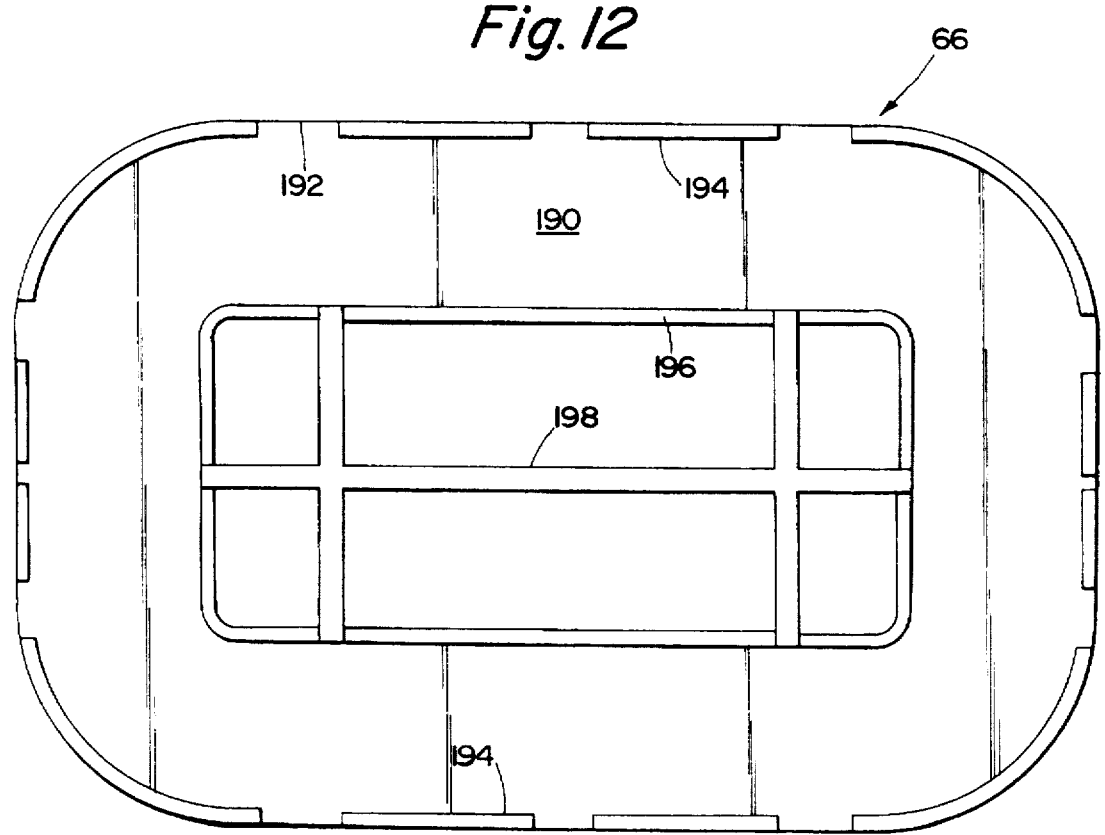
Figure 10:
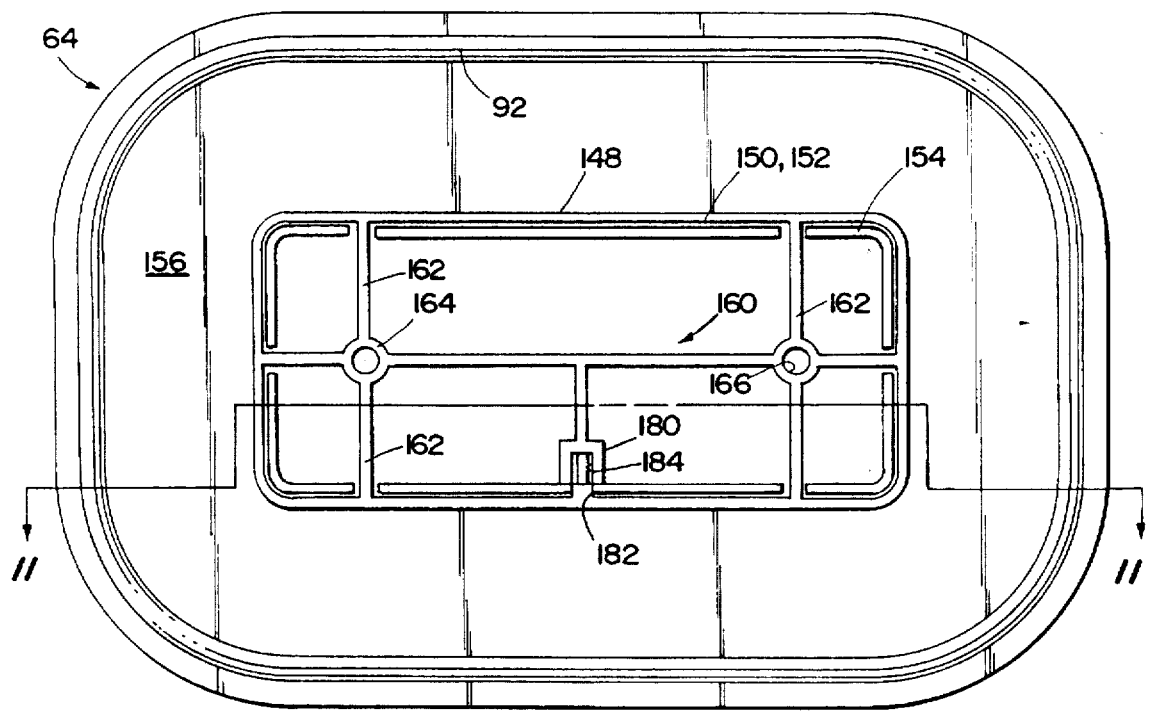
FIG. 10 is a plan view of the bottom member comprising a portion of the base assembly.
Figure 11:
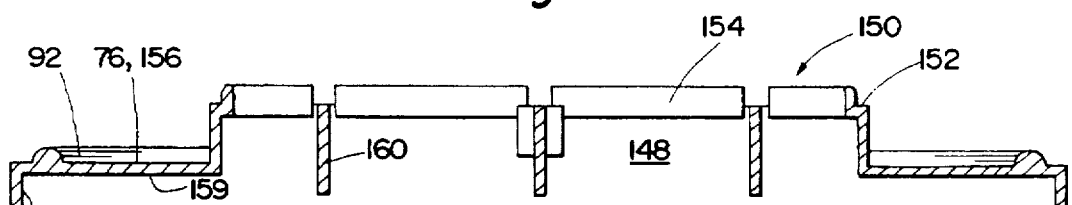
FIG. 11 is a sectional view of the bottom member taken along line XI—XI shown in FIG. 10.

For the purposes of the following description, the terms "upper," "lower," "right," "left," "front," "rear," "vertical," "horizontal," and derivatives or equivalents thereof shall relate to the invention as oriented in FIG. 2. It is understood that the invention may assume various alternative orientations, except where expressly specified to the contrary. It is also understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered limiting unless the claims expressly state otherwise.

Figure 1:
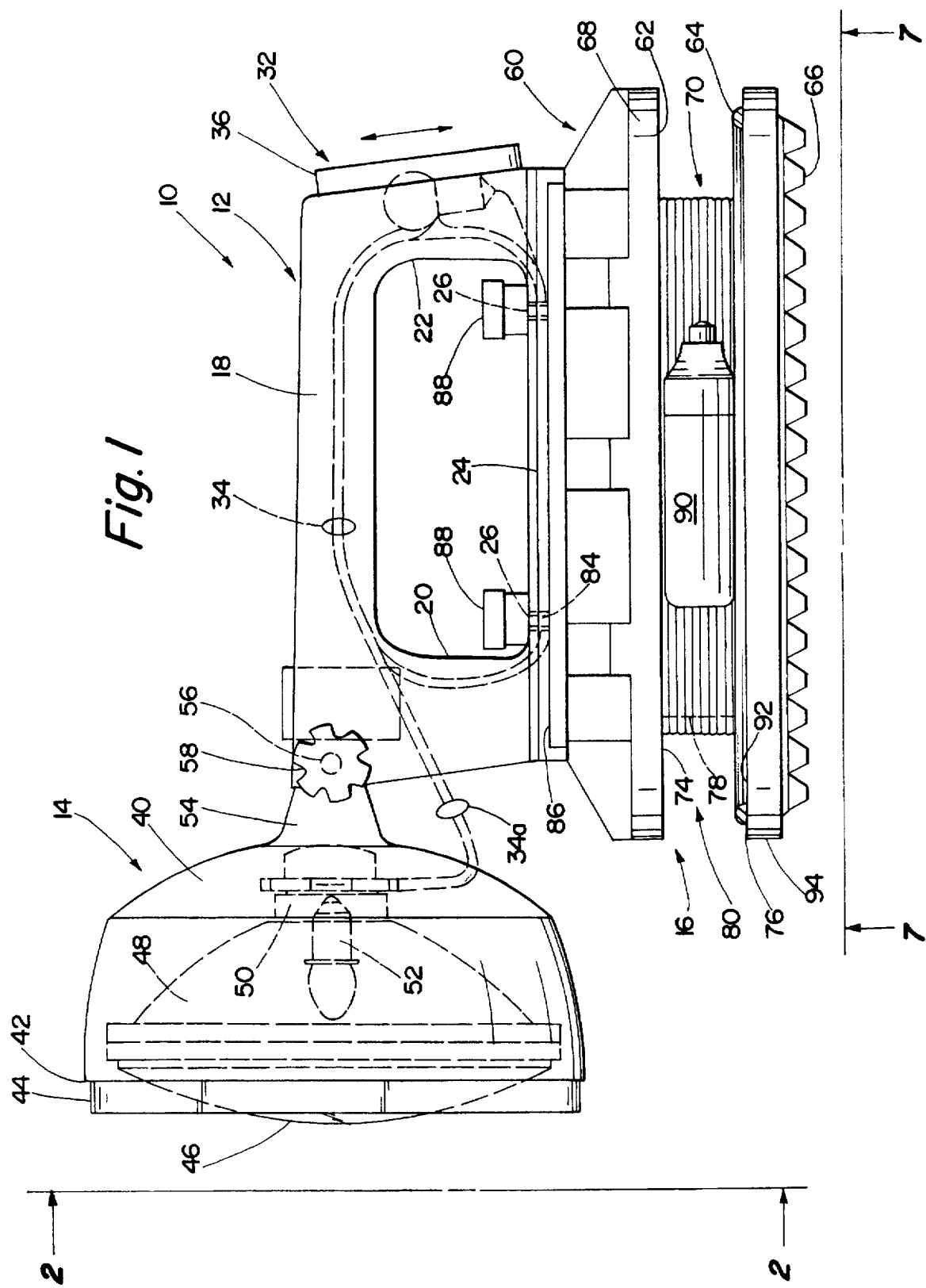
FIG. 1 is a side elevational view of a preferred embodiment of the invention.

With reference to FIGS. 1 and 2, a preferred embodiment of the lantern 10 includes a cover assembly 12 adjustably supporting a lamp assembly 14 at one end, and disposed on top of a base assembly 16. Cover assembly 12 includes a handle 18 terminating in downwardly extending front and back legs 20, 22, respectively, disposed on top of and interconnected to a cover plate 24. Cover plate 24 contains two perforations or eyelets 26 spaced from each other and located substantially below handle 18. Additionally, each eyelet is located proximate a respective leg 20, 22. Cover assembly 12 is preferably molded in two or more pieces from ABS 450 plastic or generally equivalent material in a manner so as to define an internal cavity (not shown).

Cover assembly 12 further includes a switch assembly 30 disposed substantially above front leg 20 and a blinker assembly 32 disposed within the back leg 22 at the back of the cover. Switch assembly 30, blinker assembly 32, and lamp assembly 14 are interconnected by electrical wires within the cover, which are also in contact with terminals extending from base assembly 16 and described in greater detail below. Switch assembly 30 preferably includes a switch housing and a conventional push-button switch covered by a rubber or flexible polymeric boot and securely fastened within handle 18. Likewise, blinker assembly 32 includes a lamp socket retaining a blinker bulb mounted within a cartridge and disposed in sliding relationship with an electric contact strip. The lamp socket, blinker bulb, and cartridge are mounted in a bracket which is attached to a blinker lens 36, which closes the blinker assembly 32 within back leg 22 and also serves as the actuator to activate and deactivate the lamp within the blinker assembly.

Lamp assembly 14 includes a bell-shaped housing 40 and closed at an open end 42 by a lens ring 44 trapping a lens 46 and a reflector 48. Retained in the base of reflector 48 is a lamp retainer 50 suitably positioning a lamp 52 at the focal point of the reflector. Lamp retainer 50 is operably coupled to switch assembly 30 by wire conductors 34a. The bell-shaped housing 40 is coupled by a pair of bracket arms 54 extending from the rear of bell housing 40 and pivotally coupled to the top of front leg 20 by a double-threaded end screw 56 extending through the top of front leg 20, each end receiving an adjusting nut 58 tightened along screw 56 to clamp bracket arms 54 against the sides of front leg 20. Bell housing 40 and adjusting nuts 58 are preferably formed from ABS 450 plastic or similar material with lens 46 and reflector 48 formed from the same polycarbonate material as blinker lens 36.

Although the preferred embodiment of cover assembly 12 and lamp assembly 14 are as described above, it is contemplated that any combination cover and lamp assemblies, which are particularly adapted and configured to be coupled to a battery consisting of eight, No. 60 (size "F") cells in series may be used in conjunction with base assembly 16, to be described below. It is preferred that the cover plate 24 of cover assembly 12 have the eyelets 26 spaced between 86.5 millimeters (mm) and 84.9 mm apart from each other and that the interior dimension of the lower surface of cover plate 24 have a width ranging between 72.2 mm and 69 mm and a length within the range of 135.7 mm and 132.5 mm. The dimensions for the eyelets 28 and the dimensions of the interior lower surface of cover plate 24 generally coincide with the size variations typically found on batteries having eight No. 60 (size "F") cells in series as well as the distance between the terminals extending from the top of such a battery. For example, and not by way of limitation, a suitable cover and lamp assembly is provided in the Model 321 lantern available from Eveready Battery Company of Westlake, Ohio.

Base assembly 16 may be assembled from four components including a top exterior member 60 super-positioned on top of and covering a top interior member 62 which, in turn, has a lower surface coupled to a bottom member 64 which, in turn, has a lower surface receiving and is coupled to a foot member 66. Top members 60, 62, and bottom member 64 may be molded from a general-purpose polystyrene (GPPS), a high-impact polystyrene (HIPS), or more preferably a mixture of the two components with the mixture including 30 percent GPPS and 70 HIPS. Most preferably, to reduce costs, top members 60, 62 are molded as a single, integral component. With respect to foot 66, it is preferred that it is molded from polyvinylchloride (PVC) to provide a more flexible surface having a higher coefficient of friction than the top and bottom members. When assembled, these components generally define a top plate or member 68 defined by exterior and interior members 60 and 62, interconnected to bottom member 64 by a lesser diameter neck portion 70 formed by the junction of top interior member 62 with bottom member 64. Wall 74 of the top interior member 62, when combined with wall 76 of bottom member 64 and the wall 78 of neck portion 70, define the side and bottom walls, respectively, of a channel 80 which extends around the circumference of base assembly 16. This circumferential channel is specifically configured and adapted to receive between 5 and 8 meters of electrical cord 82 having at least two insulated, twisted wire conductors wrapped around neck portion 70 within channel 80. The conductors at one end of the electrical cord 82 are coupled to respective terminals 84 extending through base assembly 16 and up from upper surface 86 of top exterior member 60. Each terminal 84 is fastened to cover plate 24 by a respective terminal nut 88. The opposite end of electrical cord 82 has its respective wire conductors attached to a cigarette plug/power adaptor 90. In a preferred embodiment, cigarette plug/power adaptor 90 is completely retained within channel 80 by a rib, ridge, or lip 92 extending from wall 76 proximate peripheral edge 94 from base assembly 16. The distance between the top of ridge 92 and wall 76 is just slightly smaller than the diameter of cigarette plug/power adaptor 90.

Referring to FIGS. 3–6, top exterior member 60 includes a generally rectangular wall 100 having an upper edge 102 generally defining the upper surface 86. A lower end of wall 100 terminates in an outwardly extending flange 104. Joining flange 104 with wall 102 and spaced periodically around the entire circumference of the top exterior member 60 are buttresses 106. Depending from a peripheral edge 108 of flange 104 and buttresses 106 is a downwardly extending lip or flange 109. A lower surface 110 is defined around the interior perimeter of top exterior member 60 by the outwardly extending flange 104, interrupted only periodically by the upwardly extending walls 112 extending between flange 104 and the sloping surface 114 of each buttress 106. Disposed within the interior of the top exterior member 60 and interconnecting walls 100 is a webbing 116 having spiders 118 interconnected at junctions 120 having a vertically extending hole 122 adapted and configured to receive a bolt 172 (FIG. 6) interconnecting the top exterior member 60, top interior member 62, and bottom member 64 and forming each of the terminals 84 mentioned earlier. It is preferred that the top exterior member 60 is molded from a 30/70 mixture of GGPS/HIPS plastic with a wall thickness within the range of 0.07 and 0.08 inches and most preferably 0.08 inches.

Nestably received against the interior lower surface 110 and within flanges 109 depending from peripheral edge 108 is the top interior member 62 (FIGS. 4–9). Interior member 62 is also molded from a 30/70 mixture of GGPS/HIPS plastic with wall thicknesses within the ranges described above with respect to the top exterior member 60. Interior member 62 is also generally rectangular in shape and includes a central interior wall 130 having an upper end terminating in an outwardly extending flange 132 which, in turn, terminates at its peripheral edge in an upwardly extending lip or wall 134 and having a dimension substantially equal to the flange or lip 109 depending from the peripheral edge 108 of the top exterior member 60. Disposed within the interior of member 62 and supporting walls 130, flange 132, and lip 134 is a webbing 136 interconnected at junctions 138 having vertically extending holes 140 which align with the holes 122 formed in the junction 120 of spiders 118 in exterior member 60. Holes 140 receive the same bolt which defines the terminals 84 interconnecting member 60, 62 and bottom member 64, as briefly mentioned above.

Although top exterior and interior members 60, 62 are shown as separate components, it is preferred that members 60, 62 be molded as a single, integral structure to reduce assembly time and capital cost associated with making a separate mold for each component. It is preferred that the overall structure is substantially the same with exception of the joint between the two members 60, 62. The structure can be simplified to produce the central interior wall 130 to mate with the bottom member 64.

Attached to the lower end of the member 62 and oriented concentrically therewith is bottom member 64 (FIGS. 4–6, 10, and 11). Bottom member 64 includes a generally rectangular inner wall 148 having an upper end 150 defining a shoulder 152 and an inwardly disposed and concentric upwardly extending flange 154 and molded from the same material as member 60. The outside dimensions of flange 154 are substantially the same as the interior dimensions of wall 130, such that flange 154 is received between walls 130 and such that wall 130 rests upon shoulder 152. The opposite ends of wall 148 terminate in an outwardly extending flange 156 to define wall 76 of the channel 80. Flange 156 terminates in a peripheral edge 84, which extends downwardly to form a depending flange 158. Supporting wall 148 and flanges 156, 158 is a webbing 160 having a plurality of spiders 162 interconnected to each other at junctions 164 which have vertically extending holes 166, particularly configured and adapted to align with holes 140 and 122 in the interior member 62 and 60, respectively. Defined at the lower end of holes 166, and concentric therewith, is a countersink 168 (FIG. 6) adapted to receive the head 170 when the shaft 172 of terminal 84 extends through the holes 166, 140, 122 and out through the top or upper surface 86 to interconnect the three components together to form the base assembly 16. Each terminal is retained within the holes, and the three components are held together by a retaining nut 174 received over the threaded end of the terminal 84.

Defined in the interior of bottom member 64 and supported by spider member 162a is an anchor block or cage 180 positioned over or adjacent an opening 182 extending through wall 148. Anchor cage 180 also includes at least one opening 184 to allow the passage of the power cord into the interior of the base assembly, for reasons which will become apparent below.

Figure 14:
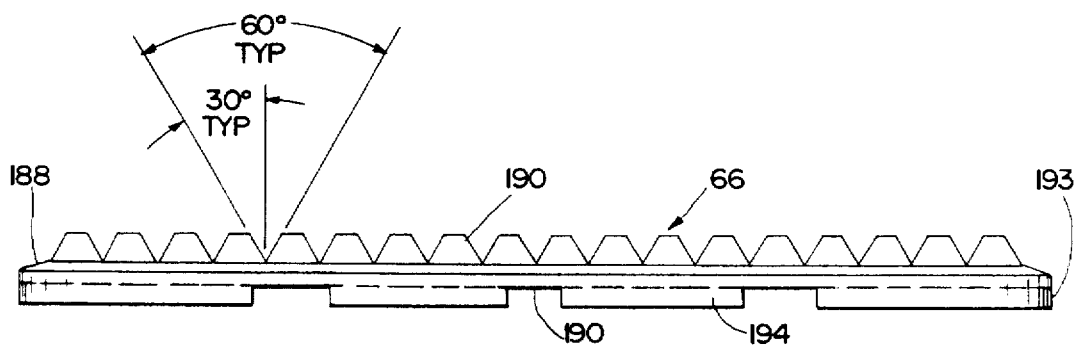
FIGS. 14 and 15 are side and end elevational views, respectively, of the foot member shown in FIG. 12.
Figure 15:
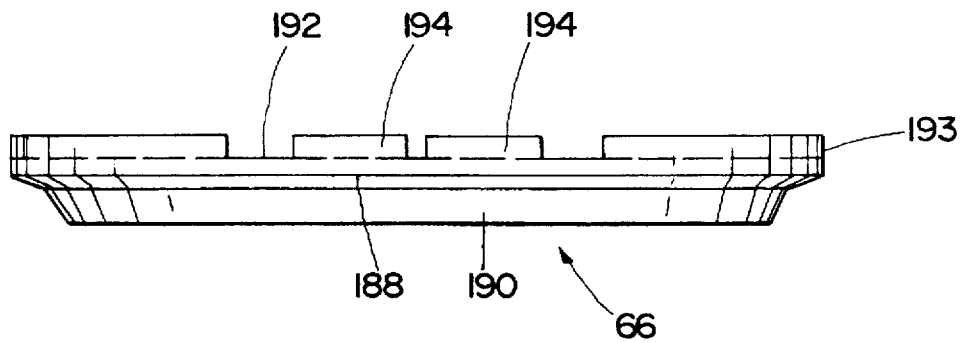

Nested within the lower surface of bottom member 64 and within the boundaries defined by flanges 158, is foot member 66 (FIGS. 4–6 and 12–15). As mentioned briefly above, foot member 66 is preferably formed from a flexible PVC material or similar material which is somewhat compliant and has a higher coefficient of friction than the material used to form the top and bottom members. In the preferred embodiment, foot member 66 includes treads or cleats 190 which substantially parallel each other in a direction generally perpendicular to the length of the bottom member. For example, as shown in FIGS. 14 and 15, cleats 190 extend from a surface 188 and parallel those having a generally triangular cross section such that the slope of each cleat 190 is within the range of 25° and 45° from a plane oriented substantially perpendicular to surface 188, and more preferably at an angle of 30° from the normal. Extending from an opposite surface 190 and adjacent the peripheral edge 192 are a plurality of tabs 194 intended to engage the lower surface 159 between flanges 134. Disposed to the interior of peripheral edge 193 on surface 190 may be additional flanges or ridges 196 and 198 which coincide with the pattern provided by the webbing 160 and spiders 162 formed in the bottom member 64 so as to provide support to the interior portion of the foot member. Foot member 66 may be attached to the bottom of bottom member 64 by a plurality of screws extending through the bottom of foot member 66 and into threaded holes provided in the webbing 162 of bottom member 164.

Figure 16:
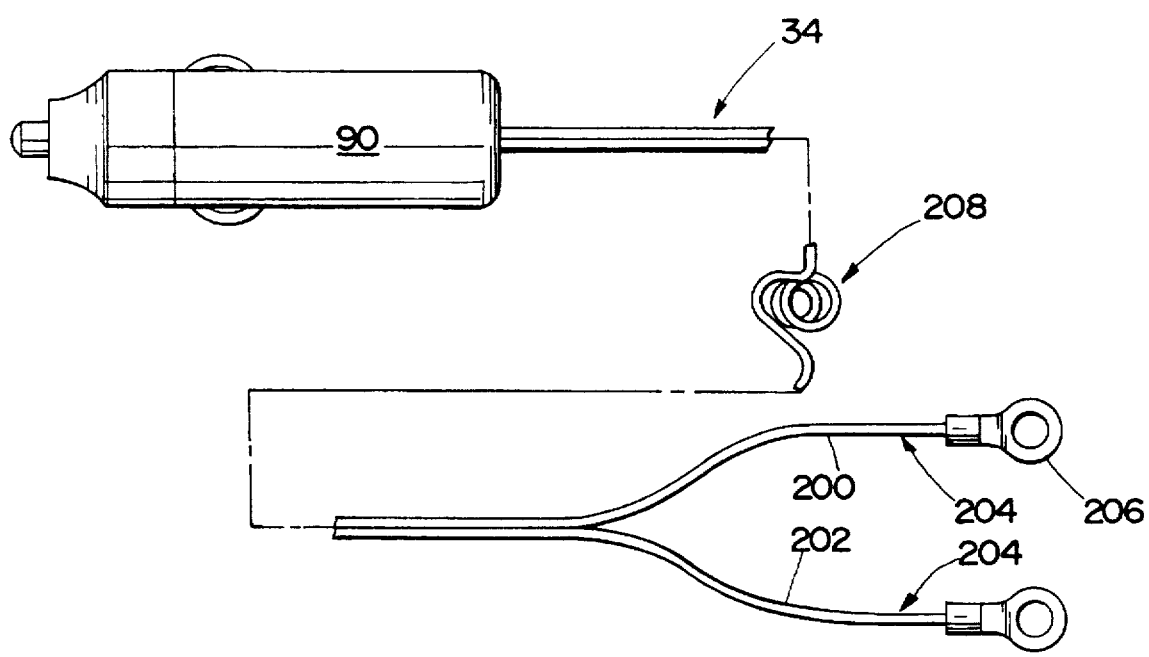
FIG. 16 generally illustrates the wire cord used in association with the invention.

In one embodiment of the invention, a length of electric cord is provided having terminals at one end which are fastened to terminals extending from the top of base assembly 16, and the opposite end fitted with a cigarette lighter plug/power adaptor which is to be received in any conventional cigarette plug receptacle to power the lantern 10. Referring to FIG. 16, the electrical cord 34 includes a pair of insulated conductors 200, 202 each having one end 204 having the insulation stripped away and receiving a conductive eyelet 206. Each conductive eyelet 206 extends up through the interior of base assembly 16 and receives a respective terminal 84. Electrical cord 34 then descends down through base assembly 16 and includes a knot or other anchor 18 interacting with anchor block or cage 180 to secure the end 204 of the electrical cord 34 within base assembly 16 and to prevent the cord to be withdrawn and broken away from terminals 84. The electrical cord 34 then extends from anchor cage 180 through opening 182 into channel 80 where the length of the electrical cord 34 may be wrapped around and stored thereon. The cigarette plug/power adaptor is also stored within channel 80 and frictionally retained therein by ridge 92 which has sufficient relief so as to just allow the passage of plug/power adaptor 90 into channel 80.

In an alternate embodiment, to accommodate lengths of electrical cord beyond the capacity of the embodiment described above, the height of walls 130, 148 may be increased to increase the width of channel 80, or an insert may be provided to increase the space between walls 74 and 76 to accommodate the additional length of cord. In addition, it is contemplated that cover assembly 12 along with lamp assembly 14 may be detached from base assembly 16 by unscrewing terminal nuts 88 from terminals 84 and allowing separation of the components. Cover and lamp assemblies 12 and 14 may then be inserted on a conventional 6-volt "F" series battery, as described above, so that the lamp assembly may then be used at distances away from the power source making it unreasonable to use an electrical cord.

In operation, the lantern is assembled as described above with the electrical cord 34 wrapped around the neck portion 70 defined by walls 130 and 148. The cigarette plug/power adaptor 90 is also stored within channel 80 between walls 74 and 76 and between the neck portion 70 and the ridge 92. To dislodge the cigarette plug/power adaptor 90 and to payout the electrical cord 34, the operator simply wedges the adaptor 90 over ridge 92 and unwraps the power cord. The operator than installs the adaptor into a cigarette lighter receptacle to provide power to switch assembly 30 and blinker assembly 32. The operator can activate the lamp 52 by depressing switch 30 to complete the circuit between terminals 84 receiving power from the cigarette lighter receptacle to the lamp. Likewise, blinker assembly 32 may be activated by sliding the blinker lens 36 upward to operably couple the lamp to terminals 84 powered by electrical cord 34. With the appropriate lamps actuated by the switches provided, the operator may position the lamp on substantially any surface and swivel the beam so as to illuminate the desired area. The wide footprint provided by the base assembly 16, which has a width and length substantially greater than the height of the base assembly, provides the lantern with a substantially low center of gravity and stable configuration so it will not be easily tipped. Additionally, the large footprint, taken together with the high coefficient of friction offered by the PVC foot, increases the surface friction between the lantern and any substrate upon which the lantern is resting, thus preventing the lantern from slipping or sliding off the surface. Additionally, because the lantern is formed from a non-conductive, high-impact plastic, the base assembly is substantially rugged-suitable for use in many harsh environments. When the operator no longer has a need to use the lantern 10, the adaptor 90 is removed from the cigarette plug receptacle and the cord 34 is wrapped around the neck portion 70 and the adaptor 90 is then wedged back into channel 80 over ridge 92.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A hand-held lantern, comprising:
    a base having a bottom and a top spaced from and interconnected to said bottom by a neck defining a channel extending entirely around said base between said bottom and top and open to an exterior of said base; and
    a lantern assembly and a cover assembly attached to said top of said base.

2. The hand-held lantern as defined in claim 1, further including a pair of terminals disposed in said top and attaching said cover assembly to said top;
    an electrical conductor having one end attached to said pair of terminals; and
    an opposite end adapted and configured to be coupled to a power source.

3. The hand-held lantern as defined in claim 2, wherein said bottom includes a treaded foot disposed on a lower surface of said bottom.

4. The hand-held lantern as defined in claim 3, wherein said base has a length and a width greater than its height to provide a low center of gravity and a more stable base.

5. The hand-held lantern as defined in claim 4, wherein said electrical conductor is adapted to be wrapped around said neck and stored thereon.

6. The hand-held lantern as defined in claim 5, further including a raised bead extending from an upper surface of said bottom for detachably retaining said opposite end of said electrical conductor in said channel of said base.

7. A lantern, comprising:
    a cover assembly including a handle and having a mounting plate interconnecting opposite ends of said handle, said mounting plate having a pair of electrical connectors defined therein;
    a lamp assembly attached to one end of said handle and electrically interconnected to said pair of electrical connectors in said mounting plate;
    a base assembly attached to said mounting plate of said handle, said base assembly including a circumferential channel configured to store therein a length of electrical conductor having one end electrically connected to said electrical connectors in said handle plate and an opposite end configured to be coupled to a power source.

8. The lantern as defined in claim 7, wherein said base assembly includes a top member interconnected to a bottom member by a lesser diameter neck portion, said circumferential channel having a bottom wall defined by said neck portion, a first side wall defined by said top member, and a second wall defined by said bottom member.

9. The lantern as defined in claim 8, further including a bead defined along at least said second wall extending into said circumferential channel.

10. The lantern as defined in claim 8, further including a pair of electrically conductive posts extending from an upper surface of said top member, each received in a respective electrical connector defined in said plate, and extending through said plate; and
    a pair of fasteners, each received over a respective post to fasten said handle to said base.

11. The lantern as defined in claim 8, further including tread attached to a lower surface of said bottom member.

12. The lantern as defined in claim 7, wherein said base is generally rectangular in plan view and has a width and a length greater than a height of said base assembly.

13. The lantern as defined in claim 7, further including a blinker lamp assembly disposed in an end of said handle opposite that receiving said lamp assembly, and electrically interconnected to said pair of electrical connectors through a switch.

14. The lantern as defined in claim 7, wherein said lamp assembly is pivotally coupled to said one end of said handle.

* * * * *